United States Patent
Weinman, Jr.

(10) Patent No.: US 10,307,680 B1
(45) Date of Patent: Jun. 4, 2019

(54) ON-DEMAND RICH MEDIA CONTENT DISTRIBUTION RESPONSIVE TO ON-LINE GAMER POSITION AND STATUS

(75) Inventor: Joseph B. Weinman, Jr., Somerset, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1053 days.

(21) Appl. No.: 11/237,255

(22) Filed: Sep. 28, 2005

Related U.S. Application Data

(60) Provisional application No. 60/625,992, filed on Nov. 8, 2004.

(51) Int. Cl.
| | | |
|---|---|---|
| A63F 13/00 | (2014.01) | |
| A63F 13/61 | (2014.01) | |
| A63F 13/35 | (2014.01) | |

(52) U.S. Cl.
CPC .............. *A63F 13/61* (2014.09); *A63F 13/35* (2014.09)

(58) Field of Classification Search
CPC ................................ A63F 13/35; A63F 13/61
USPC .......................................................... 463/42
See application file for complete search history.

(56) References Cited

U.S. PATENT DOCUMENTS

| | | | |
|---|---|---|---|
| 5,485,609 A * | 1/1996 | Vitter et al. | |
| 5,879,236 A * | 3/1999 | Lambright | 463/42 |
| 6,036,601 A * | 3/2000 | Heckel | 463/42 |
| 6,671,732 B1 | 12/2003 | Weiner | |
| 6,716,102 B2 | 4/2004 | Whitten et al. | |
| 6,725,260 B1 | 4/2004 | Philyaw et al. | |
| 6,848,004 B1 | 1/2005 | Chang et al. | |
| 6,850,250 B2 | 2/2005 | Hoch | |
| 6,859,840 B2 * | 2/2005 | Singal et al. | 709/232 |
| 6,866,587 B1 * | 3/2005 | Lane | 463/43 |
| 6,878,067 B2 | 4/2005 | Blanco | |
| 6,908,389 B1 | 6/2005 | Puskala | |
| 6,910,049 B2 | 6/2005 | Fenton et al. | |
| 6,928,414 B1 * | 8/2005 | Kim | 705/14 |
| 6,955,604 B1 * | 10/2005 | Graves et al. | 463/42 |
| 2002/0010026 A1 * | 1/2002 | York | 463/47 |
| 2004/0148221 A1 * | 7/2004 | Chu | A63F 13/12 705/14.51 |

* cited by examiner

*Primary Examiner* — Kang Hu
*Assistant Examiner* — Thomas H Henry
(74) *Attorney, Agent, or Firm* — Fay Kaplun & Marcin, LLP

(57) ABSTRACT

A game system for running a game with access to rich media content for at least one player includes one or more gaming consoles that are connected to a network with a content server that is in communication with the gaming console. The content server provides rich media content through a network for use with the user-play game. A content information receiver, disposed in the gaming console and connected to the network, receives the rich media content provided from the content server. A compositor is used to composite the rich media content with the game, and a game executer, that is provided in the gaming console, executes the game while involving the at least one player.

18 Claims, 4 Drawing Sheets

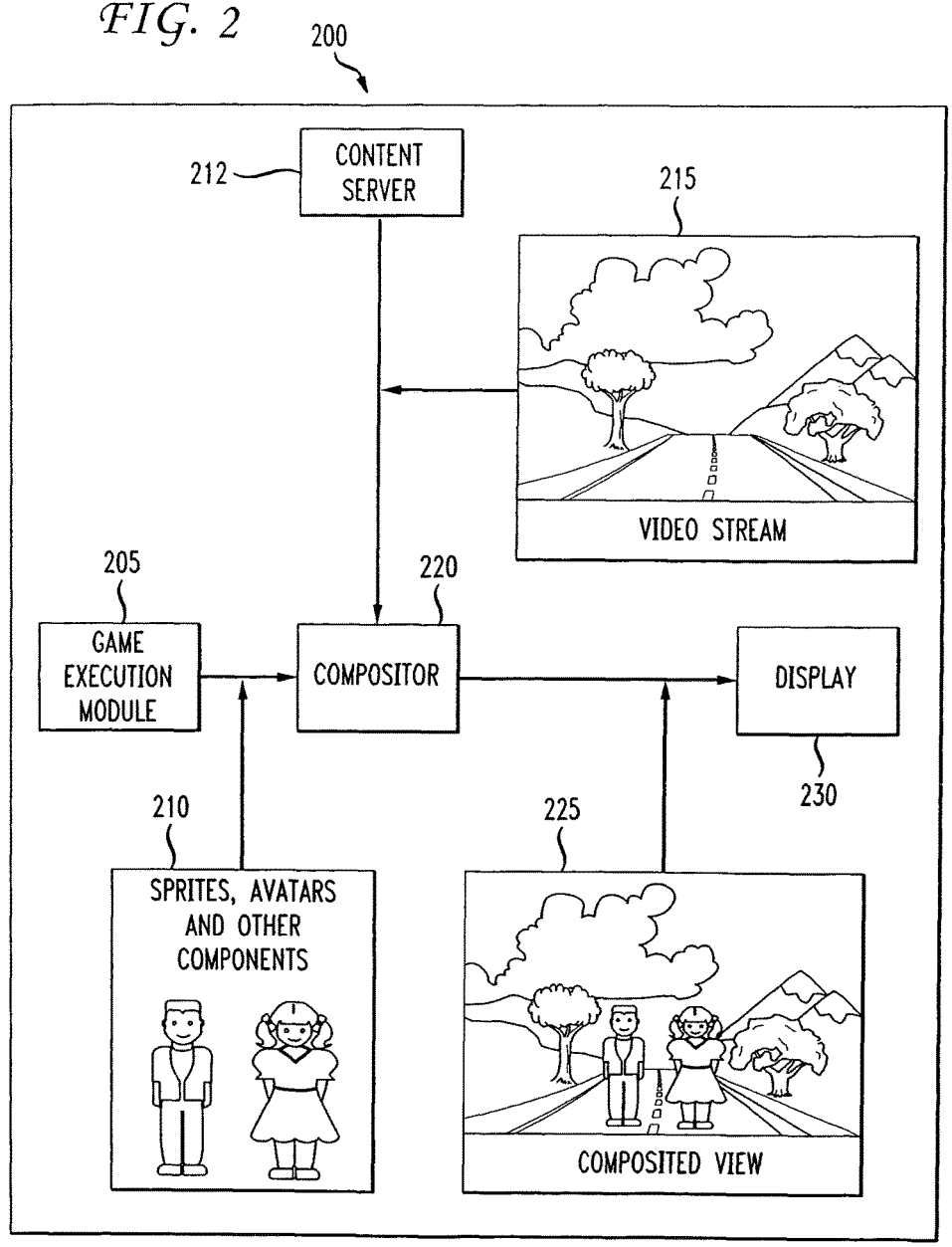

ON-DEMAND RICH MEDIA CONTENT DISTRIBUTION RESPONSIVE TO ON-LINE GAMER POSITION AND STATUS

CROSS REFERENCE TO RELATED APPLICATIONS

The present application claims priority to U.S. Provisional Patent Application Ser. No. 60/625,992 filed on Nov. 8, 2004.

FIELD

The present embodiments relate to electronic games and a method to enhance user experience using rich media accessed across a content distribution network in accordance with a player's position or player's status.

BACKGROUND

Today, electronic gaming has become increasingly popular among a broad demographic ranging from kids to seniors. For example, gaming consoles such as the Xbox, from Microsoft Corporation, or the PlayStation, from Sony Corporation of America, are used typically in conjunction with a television set so that typically one to four players can play games. In addition, Personal Computers (PCs), Personal Digital Assistants (PDAs), cell phones and the like can function as game consoles, such consoles being either substantially self-contained or used in combination with adjuncts such as graphics accelerator boards, television sets, high definition monitors, LCD displays, amplifiers, speakers, headphones, and the like.

This range of consoles runs games ranging from Solitaire, available from Microsoft Corp. of Redmond, Wash., to such games as the Sims, available from Electronic Arts. Some of these games have game logic execution and user interface generation, e.g., display graphics generation and/or single or multi-channel audio generation which is primarily conducted within the console. Some games, typically on-line PC games, can have game logic execution and presentation graphics generation conducted locally at the PC, or game logic and/or presentation graphics that are primarily executed remotely at a game server, which is accessed by a network, which can be a dial-up network, or a broadband network such as DSL, cable, or Fiber to the Home, satellite, or the like. The moves or situation generated remotely by the game logic, and the graphics generated remotely, can be viewed locally by the user through an interface such as a browser, or locally executing software. Examples of such games include single player browser-based games such as solitaire, two person games such as chess or checkers, four person games such as bridge, multiplayer games with a small number of users, such as poker, or so-called massively multiplayer online games (MMOGs), a subset of which includes massively multiplayer online role playing games (MMORPGs) which can include hundreds, thousands, tens of thousands or more simultaneous players. Examples include The Sims Online, from Electronic Arts, and Everquest, from Sony Online Entertainment. Online games are also accessible through the latest game consoles, e.g., Xbox Live provides online gaming via a gaming console used in conjunction with a network and network-resident game server(s).

These games, which are graphics rich and lifelike, require distribution of the game client software from the game "manufacturer" to the physical device, i.e., game console, with which the user interacts. A complex game is delivered through one or more CDs, DVDs, specialized hardware modules, or the like, and updates or modifications can be delivered over a network. In some cases, such as cell phones and wireless PDAs, everything required to play the game (except of course for the actual cell phone or PDA) can be delivered over a wireless network.

The software, thus delivered, defines the game logic (e.g., 3 more bananas are needed to reach the next level of play), and the graphics displayed (e.g., display the green monster facing southwest, doing his mean dance, holding the laser sword with the castle fireplace as the background). Graphics, possibly assisted through a hardware graphics accelerator, are constructed by doing 3D modeling of thousands or millions of polygons, in conjunction with techniques which are known in the art for lighting, shading, shadow generation, transparency, texturing, and the like.

Separately, traditional broadcast networks have been used to deliver video and audio programming over airwaves and cable networks. Increasingly, content distribution networks and multicasting have been used to distribute rich content (e.g., audio, still images, video, or combinations of these) over networks such as private enterprise networks and the Internet. For example, one can view a video clip in a PC through service providers such as Microsoft Corporation via the Windows Media viewer, independent firms such as ifilm.com, through a variety of multimedia viewers, and also traditional broadcasters such as Cable News Network (CNN) of Atlanta, Ga., via an alternative access method, such as "surfing" to CNN.com instead of watching CNN on television.

In a basic implementation, such a content distribution network, as we shall call all such networks used for distributing rich media, can consist of a single server located somewhere in the network. In more complex implementations, multiple servers located at physically dispersed parts of the network can either distribute content through downloading or through streaming, and this content can be existing, archived programming or live broadcasts. These more complex content distribution networks can make use of features such as multicasting to distribute a stream from a single source through a network both efficiently in terms of resource use and with low latency, i.e., network and end-to-end delays. They also can cache content objects or snippets of content based on patterns of user requests at the edge. Such caching can be done at the "edge" of the network, i.e., that portion of the network connected to customers, or in customer premises elements such as the hard drive of a PC. Variations on these architectures can be used to leverage partial data objects from a multiplicity of peer elements, i.e., "neighboring" PCs, to construct a complete object or stream at the desired endpoint.

Content distribution networks have been used in off-line and on-line gaming to deliver actual game code, e.g., the game software itself, new versions, updates, or modifications. However, what is sorely needed is a way to leverage content distribution networks to deliver rich media on demand to the game console, based only on the player's need to view the rich media during the game play, in a manner responsive to the user's position or status within the game, e.g., their position within a particular "room" or "zone," their ability to see certain objects based on their character's powers or capabilities, the player's point value or current score, their virtual position and direction, their virtual distance from an object, etc., to enhance the game player's experience while minimizing bandwidth and time required as well as reducing the time between the creation of the rich media and its use by a player of the game.

The present embodiments meet these needs.

SUMMARY

The present embodiments relate to systems and methods for distributing rich media content for electronic gaming. The present systems and methods permit on-line gaming with real-time access to rich media content for at least one player and including at least one gaming console, or other device, that is connected to a network in communication with a content server and data storage or other content repository, for example a file system.

The content server provides rich media content substantially in real time by downloading or streaming archived or live information through a network to a player for use with the game. A content information receiver, disposed in the gaming console, connects to the network to receive the rich media content provided from the content server. Thus, a player can receive the rich media content into the player's operating environment on such gaming console devices as a personal computer, cell phone, personal digital assistant, television or combinations thereof. Optionally, the game console can connect to game servers over a network.

A compositor, as part of the gaming system, receives the rich media that is being downloaded or streamed from the content server in response to a player's position, status, and combinations thereof in the game, and composites the rich media content with other graphics generated for the game based on a game executer, that is provided in the player's gaming console, which executes the game while involving the at least one player.

BRIEF DESCRIPTION OF THE DRAWINGS

The detailed description will be better understood in conjunction with the accompanying drawings as follows:

FIG. 2 depicts compositing in the gaming system.

Figure 1A:
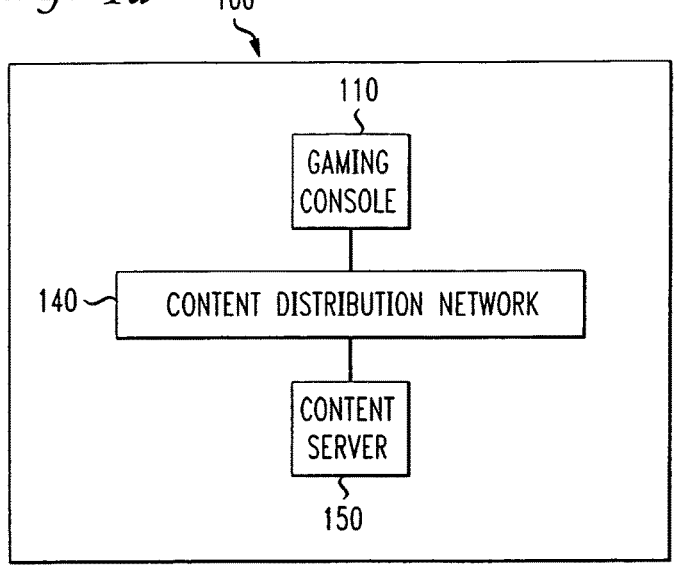
FIG. 1a depicts an embodiment of a gaming system including a content distribution network.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

In the past, on-line gaming and "content-distribution" of rich media have been thought of as separate entities. As entertainment and gaming begin to converge, users desire a more lifelike, realistic, high resolution graphics and audio intensive gaming experience. Accordingly, the present embodiments relate to a gaming system that includes one or more content servers, each of which can provide rich media content, and each of which can be a processor with memory in communication with data storage that communicates with one or more gaming console devices. Gaming software is located on the consoles, and a content distribution network maintains a connection to the content server(s) that can provide rich media content maintained by the content servers.

Each gaming console comprises a receiver to receive the rich media content, a game executer to execute the game, and a compositor to composite graphics or audio generated by the game executer with the rich media content.

The present embodiments are directed to leveraging a rich media content distribution network in combination with a game to provide an enhanced user play experience. Specifically, the game display module within the executing game responds to user position to download or stream rich media that a compositor module mixes with generated graphics (e.g., polygon, bitmap, or vector graphics). By "user position," we mean any of the static or dynamic attributes of the "player," that is the user's digital identity within the game. Such digital identity can be fairly amorphous, e.g., "the player," or fairly specific and complex, e.g., a specific character "Roxanne Righteous," with a specific configuration of powers (X-ray vision, telekinesis) at a specific location in the game (Level 12, King Ludwig's Castle, the Drawing Room), with a specific orientation (facing Northwest), during a specific activity (jumping while punching), within a specific context (having 20 power bananas left, 13 gold coins, and 3 lives), with a permutation of other components present (the ice machine has not materialized yet, but the archnemesis is attacking), and so on and so forth as is known in the art of electronic games.

Such compositing can be done where one or more rich media streams are a small portion of the overall display (e.g., the game could have a location called the electronics store, with a number of TVs visible, each of which is displaying a different video stream), or a single stream can make up most or all of the display, e.g., the entire width and height of the background can be the stream. The compositing can be graphical, as in the compositing of a video stream with graphical elements, or can be auditory, as in the compositing of an audio stream, e.g., a radio station, or real-time human conversation, with audio elements, such as "laser fire," gunshots, screams, beeps, laughter, etc.

With reference to the figures, FIG. 1a depicts an embodiment of a gaming system (100). The depicted gaming system (100) includes one or more gaming consoles (110) connected to a content distribution network (140) in communication with a content server (150). The content server (150) has a processor with memory in communication with data storage. More than one gaming or content server can be used on a network within the scope of the gaming system.

The content server (150) provides rich media by downloading or streaming through the content distribution network (140) to a player's gaming console (110) for use with the game. A content information receiver (not shown), disposed in the gaming console, connects to the network to receive the rich media content provided from the content server. A player can receive the rich media content into the player's operating environment on such gaming console devices as a dedicated game console, a personal computer, cell phone, personal digital assistant, television or combinations thereof.

Figure 1B:
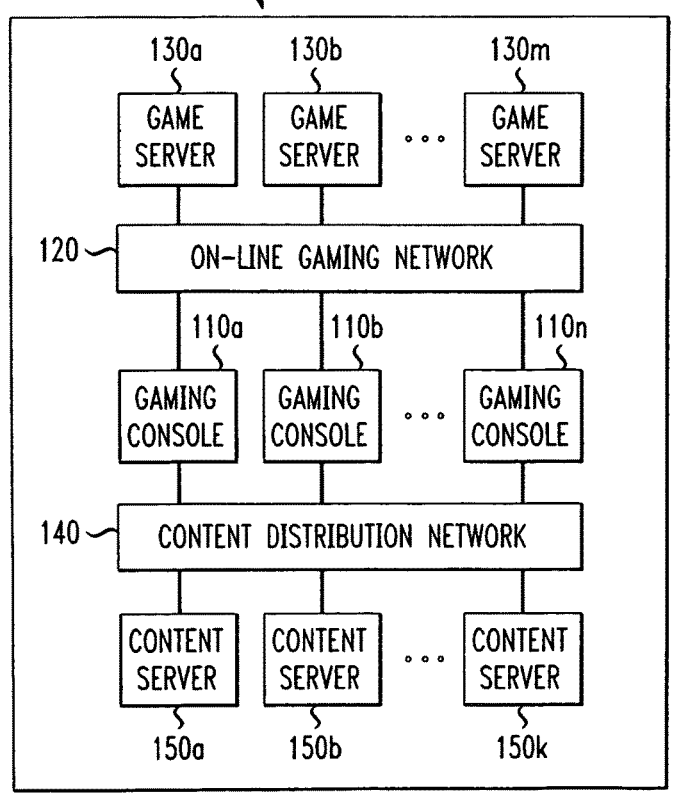
FIG. 1b depicts an embodiment of a gaming system including on-line gaming network(s) and content distribution network(s).

FIG. 1b depicts a gaming system (100) in which multiple game servers (130a, 130b, through 130m) and content servers (150a, 150b, through 150k) can be used in combination with on-line gaming networks (120) and content distribution networks (140), respectively, to simultaneously play an on-line game and distribute rich media content to one or more gaming consoles (110a, 110b, through 110n). The actual number of game servers (130x) and content servers (150x) can be greater or lesser. A single stream can come from a single content server (150a), a single stream can be delivered from a single content server selected from a plurality of potential content servers (150a, 150b, through 150k), each capable of possessing a copy of the content, multiple streams can simultaneously occur from a single content server (150b) of a single object (redundant delivery of the content object to reduce lost packets, jitter, or latency), multiple streams of different objects can occur from a single content server (150a) of multiple objects, a single logical stream can occur from multiple content servers (150x) each with some or all of the content either redundantly or non-redundantly stored, or multiple streams can be delivered to a given gaming console (110a) of different objects from a plurality of content servers (150a, 150b, through 150k). These different objects being delivered may, once delivered to the gaming console (110a, 110b, through 110n), all be viewed simultaneously, e.g., three streams can represent, respectively, the imaging of the left side, the rear, and the right side of the "room" or "zone," or they can represent different modes, e.g., one stream is video, one stream is archived audio, and another stream is live conversation, or one or more of the multiple streams can be pre-cached to enhance performance of the game since the player can "enter" an "adjacent" room in the game where that stream can be required.

Gaming consoles (110a, 110b, through 110n) are shown in FIG. 1b, although the actual number of gaming consoles (110x) can be lesser or greater. Game servers are also shown, game server (130a), game server (130b) through game server (130m), in communication with an on-line gaming network (120), where "n" and "m" can be different numbers. The game consoles can access two separate networks, an on-line gaming network (120) accesses the game servers (130a, 130b, through 130m) that provide the games to a user, the content distribution network (140) obtains content which can be multimedia clips and other content and transmits that content to gaming console (110a), gaming console (110b) through gaming console (110n). An on-line gaming network (120) and content distribution network (140) can overlap, or can be the same network, or can be a network composed of multiple networks.

FIG. 1b shows content servers (150a, 150b, through 150k). A content receiver (not shown) can be disposed in a game console (110a, 110b, through 110n) to receive content. A buffer (not shown) can be used for caching rich media content prior to providing the rich media content to the compositor. The compositor can conduct several different operations to composite the received rich content with the locally generated game display graphics. For example, game graphics, such as sprites, avatars, objects, other players, vehicles, weapons, or the like can be superimposed, either opaquely or with some degree of transparency, on rich media video or animation or still graphics images. Alternatively, the provided rich media can be "sized," warped, shaped, clipped, transcoded, transrated, or the like, either by the content server or the compositor, and placed "inside" a specific object. Various graphics transformations can be performed as required in a three dimensional game, for example, an image representing the left side of a room as viewed in the display by the player can need to be transformed from a rectangle to a trapezoid. Based on the lighting, brightness, or contrast, the image can be adjusted. For audio signals, mixing, panning across channels, using low pass, midpass, highpass, or other bandpass filters, increasing or decreasing volume, and the like, can be performed by the compositor.

FIG. 2 depicts an embodiment of a gaming system in which a video stream (215), which can be a video, an animated image, or a still image, is provided by a content server (212) across a content distribution network (not shown) to a compositor (220). Simultaneously, a game execution model (205) generates components (210) such as sprites, avatars, game objects, and the like. These at least two sources of graphics or other rich media are composited (i.e., combined) by compositor (220) to generate a composited view (225) which is then shown at display (230), possibly in conjunction with graphics accelerator cards or boards, VGA or DVI cables or the like, KVM switches, and the like. In an alternative embodiment, another player (not shown) at a first game console (not shown) having rich media components (not shown) can download and/or stream to the compositor (220) on a second gaming console (not shown) in which compositor (220) is disposed for a seamless compositing of the composite content (225) to be executed and viewed in the game via display (230). Game execution module (205) executes the game while actively involving at least one player.

Figure 3:
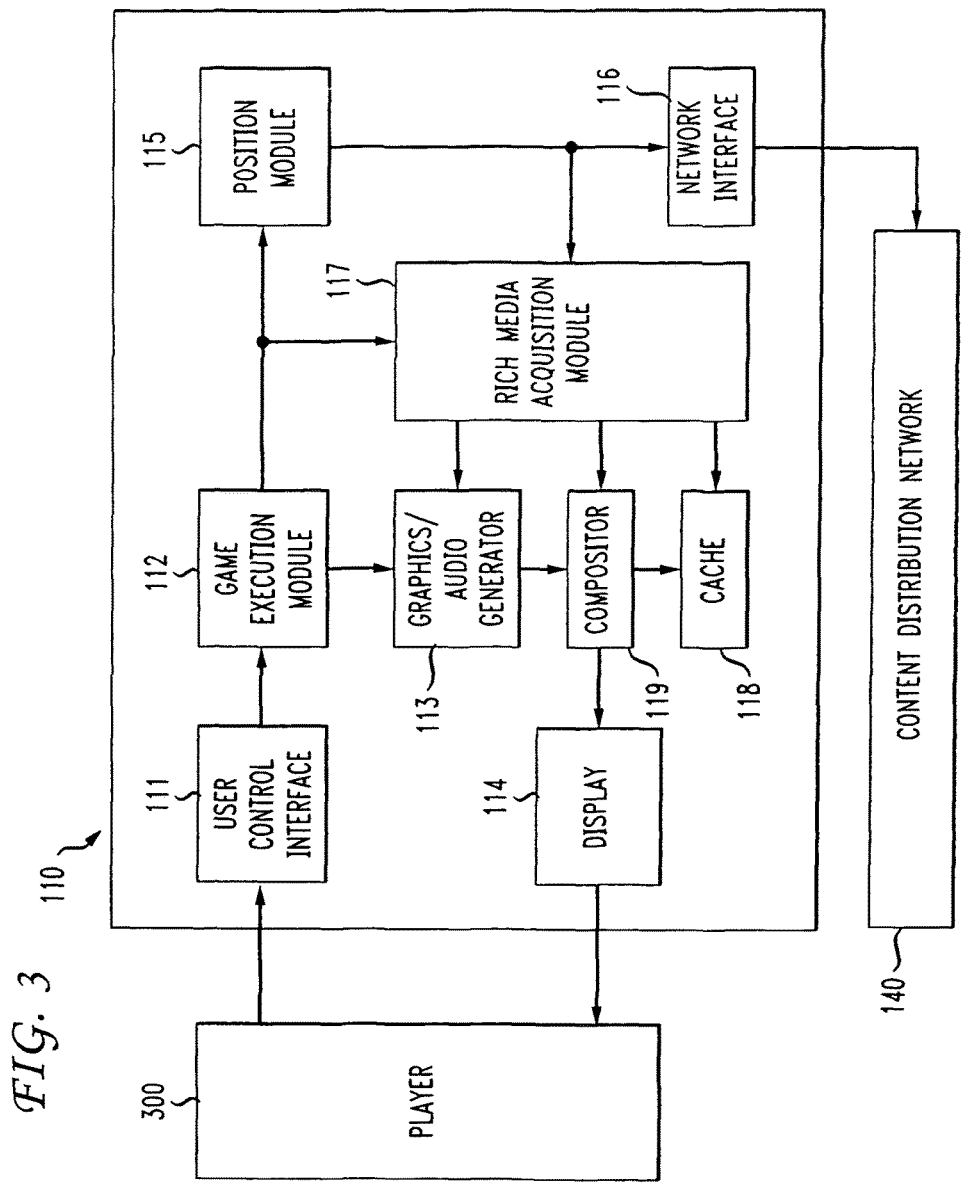
FIG. 3 depicts a diagram of an embodiment of a game console in connection with content distribution networks.

FIG. 3 depicts a diagram of an embodiment of a game console (110) in connection with a content distribution network(s) (140). A user or player (300) can operate a gaming console (110) to play a game with rich media content and characters, such as video images with audio.

The player (300) views the game during the execution of the game via display (114) and provides control inputs, typically through mechanisms such as key presses, mouse movements, button presses, joystick rotation, and the like via user control interface (111) to interact with the game via the game execution module (112). The game execution module (112) can communicate, by use of computer instructions, with the graphics/audio generator (113) to produce graphics and audio to a compositor (119) or allow interaction with the rich media acquisition module (117). The game execution module can also interact with the position module (115) that in turn interacts with the rich media acquisition module (117), which acquires rich media content via network interface (116) which connects to a content distribution network (140) communicating with at least one server (not shown) for queries and receiving rich media content. As the game is executed by a game execution module (112), at least partly responsive to a user control interface (111), position module (115) accepts updates to player position, status, and other attributes. These in turn are used to drive rich media acquisition module (117), either by requesting a specific rich media object, or by providing the position, status, and other attributes to the content server (150, 150a, 150b, through 150k) and using computer instructions in the content server (150, 150a, 150b, through 150k) to determine which rich media object should be acquired.

Game execution module (112) can query a content server (150, 150a, 150b, through 150k), using computer instructions, to bring into the game rich media content or graphics, such as a streaming video clip (215) to run on the screen during a particular point of play in the game. The computer instructions can download or stream upon a player's command or automatically based on the logic directly encoded in a game execution module (112) or indirectly as game execution module (112) executes predefined instructions or logic defining the game and can determine the existence of associated rich media clips based on a player's position or status as maintained by position/status module (115) in the game or both. In fact, multiple rich media objects can be acquired simultaneously, either for simultaneous compositing or for caching in the expectation of potential use and display.

A query from the gaming console (110) through the network interface (116) to the content server can locate rich media content, such as a video clip as illustrated in FIG. 2, and stream or download the video clip or live video back through the network interface (116) to a rich media acquisition module (117) to a compositor (119) in the game server. The compositor (119) can merge the rich media content (i.e., video clip or audio clip) with any audio or video or other graphics from the graphics/audio generator (113) into the game to appear on the screen (114) at a particular point during play of the game. Alternatively, pre-caching or buffering the rich media content in a cache (118) can be performed in anticipation of the player's possible next set of actions in the game. Advantageously, the disclosed invention can be used with or without network-resident game servers (not shown). In an alternative embodiment, where network-resident game servers need to be accessed and interacted with, or where game consoles interact with each other directly on a peer to peer basis, game execution module (112) accesses these servers or other consoles via network interface (116) and an on-line gaming network (not shown), which can be a separate network or substantially the same network as content distribution network (140).

In the embodiment of FIG. 3, an additional player-scoring module (not shown) can be provided in the gaming console, which can be separate from or disposed within game execution module (112), for scoring at least one player in connection with the executing of the game. Computer instructions can be installed to operate automatically based on a defined event occurring, such as a user reaching a certain point level in a game, such as 100,000 points, or a user reaching a certain level of play in a game, such as the "dungeon" level.

Figure 4:
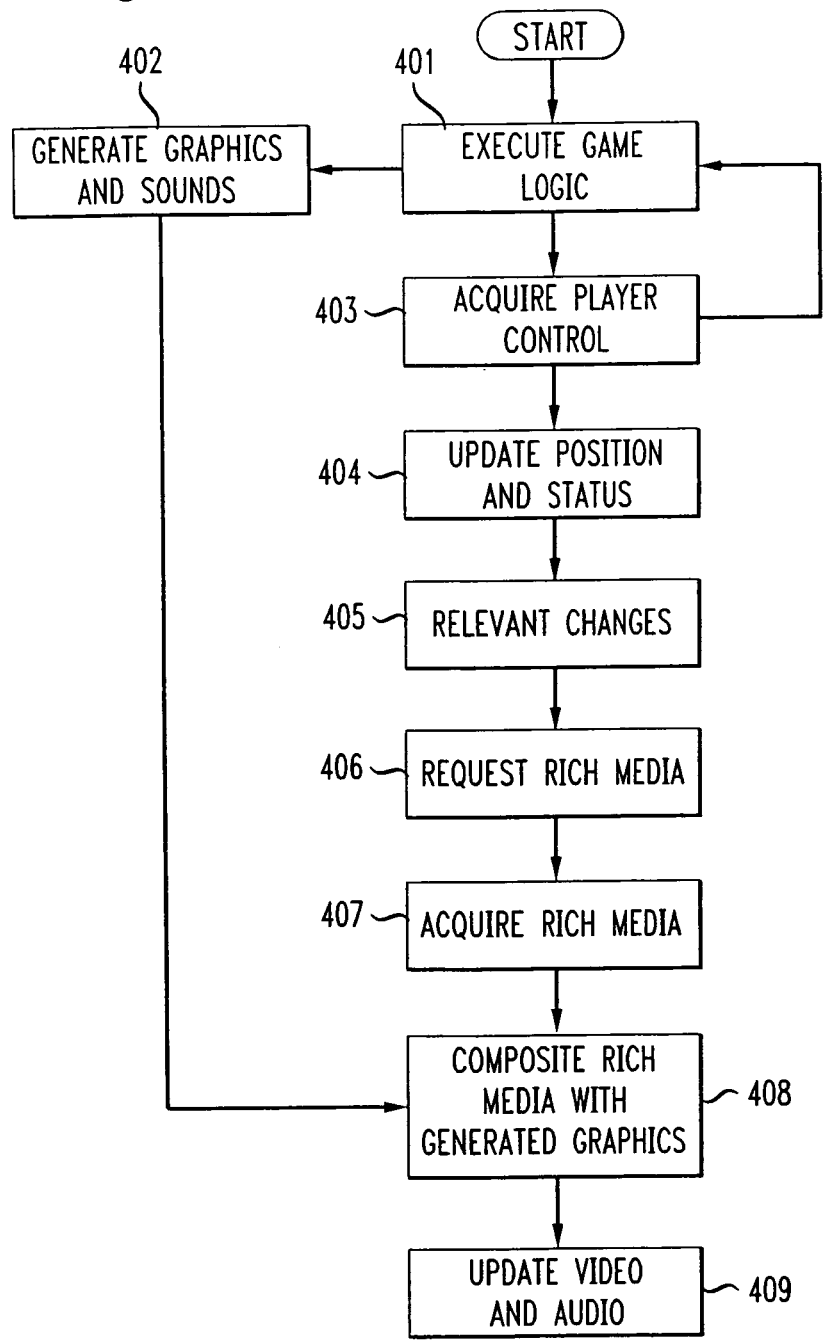
FIG. 4 depicts an embodiment of a method for electronic gaming.

Referring to FIG. 4, the game logic is executed after the game is started (401). As the game logic is executed, graphics, sounds, and other outputs such as shaking and rumbling can be generated in accordance with the visual and auditory display of the game execution (402). Player control input is provided via a mouse, keyboard, joystick, game controller, or the like (403). As control input is acquired, the course of the game can be modified and this loop repeats indefinitely until the game ends. During the execution of the game logic (401), responsive to the control input provided (403), the player's position and status change and are updated (404). Based on the player's position and status change, relevant changes to position or status are determined (405). A relevant change is one which can require new rich media to be transmitted across the network. If relevant changes exist, the rich media can be requested (406).

The rich media can be requested in numerous ways. In one example, the game logic executing (401) triggers for specific rich media content (for example, a URL such as "gamesite.com/playintro.mpg"). In this case, the rich media request can be made by downloading or streaming of that specific content. In a second example, rich media can be requested by sending a tuple of information (such as the player's position, direction, point level, or the like) to the content server (150, 150*a*, 150*b*, through 150*k*). The content server (150, 150*a*, 150*b*, through 150*k*) generates a response based on that tuple. Use of these alternative methods can result in greater flexibility in content delivery. For example, based on distance from an object provided as part of the tuple, a lower or higher resolution version of the rich media can be provided by the content server (150, 150*a*, 150*b*, through 150*k*).

Continuing with FIG. 4, once the rich media content is provided (407), the rich media is composited with the graphics, sounds, or other experiences (408). For example, the rich media content can be composited with rumbles, provided to the user via a control device providing tactile feedback. The composite display information can be used to update the actual graphics experienced by the user.

An example of the method for on-line gaming can be a game such as Nintendo™, which has a portion resident on a gaming server, and a portion on a gaming console. In the game are characters, such as Bejorn, which can be controlled by a user in the game of the gaming system. The user can control the movements of the characters, such as Bejorn can throw items, jump, hit, and travel to different levels. Rich media content can be brought into the game through a network connection and from a content server by request of the user to enhance the game.

The method for electronic gaming can entail executing game logic, generating graphics or audio responsive to the game logic, acquiring user control input, updating position or status responsive to the input, and determining whether such updates are relevant.

The method can include acquiring rich media responsive to the determination of whether updates are relevant. Acquiring rich media can be performed by determining the rich media to be acquired, using a game console to request rich media and retrieving the rich media from a content server. Acquiring rich media can be performed by passing position or status information to a content server.

The method for electronic gaming can include the step of compositing the rich media with the generated graphics or audio. Displaying the composition to the user can be a step in the method for electronic gaming.

The embodied method can include requesting rich media responsive to the determination of whether updates are relevant. This step of requesting rich media can be performed by determining the rich media resource to be acquired and a game console and requesting it from a content server.

The present embodiments permit a gaming system to be conducted via an on-line terminal network, a PC-based network, a data-transmission system, the Internet, or combinations thereof. Further, the gaming system includes mechanisms for recording a player's entry into the game using a cash method of payment or a non-cash method of payment.

The connection of the end-device of the player to the network and gaming server with a content server can bring rich media content with audio, video, and graphics into a game to allow real-time interaction and thus heighten the enjoyment of the game via a more immersive reality experience.

While these embodiments have been described with emphasis on the embodiments, it should be understood that within the scope of the appended claims, the embodiments might be practiced other than as specifically described herein.

What is claimed is:
1. A game system, comprising:
 a. a content server with rich media content connected to a network, wherein the rich media content includes rich media clips;
 b. a gaming console executing a game connected to the network, wherein the gaming console comprises:

i. a receiver to receive the rich media content; and
ii. a game executer to execute the game;
c. a compositor to modify the rich media content and composite graphics or audio generated by the game with the modified rich media content; and
d. a cache to store the rich media content in anticipation of a player's next possible action;
wherein the gaming console queries the content server for rich media content by sending a request including a player's in-game characteristics generated based on gameplay, wherein the in-game characteristics comprise a player's in-game position and a player's in-game attribute, wherein the content server includes computer instructions to evaluate the request to identify, during game play, a plurality of rich media clips stored on the content server based on the player's in-game characteristics, wherein the content server selects a first version of a rich media clip having a first resolution from the identified plurality of the rich media clips based on the first resolution corresponding to a distance between the player's in-game position and an in-game object, and to stream the first version of the rich media clip to the gaming console.

2. The game system of claim 1, further comprising computer instructions to determine and pay out an amount of game values to a player who satisfies a player-scoring requirement.

3. The game system of claim 1, further comprising computer instructions to determine and pay out at least a portion of a total amount of game values to a game owner.

4. The game system of claim 1, further comprising a video module to play streaming live video from another gaming console executing the game to the compositor.

5. The game system of claim 1, wherein the gaming console further comprises a player-scoring module to track scoring for at least one player while executing the game.

6. The game system of claim 1, wherein the game system operates via an on-line terminal network.

7. The game system of claim 1, wherein the game system operates via a PC-based network.

8. The game system of claim 1, wherein the game system operates through a data transmission system.

9. The game system of claim 1, wherein the game system operates via the Internet.

10. The game system of claim 1, wherein the game system further comprises a recording module to record a player's entry to the game using a non-cash payment method.

11. The game system of claim 1, wherein the game system further comprises a recording module to record a player's entry to the game using a cash payment method.

12. The game system of claim 1, wherein the player's in-game attribute comprises the user's digital identity within the game.

13. The game system of claim 12, wherein the digital identity comprises one of the player's character's powers or capabilities, point value or current score, virtual position and direction, virtual distance from an object, or certain point level or level of play in a game.

14. The game system of claim 12, wherein the digital identity further comprises the character's ability to see certain objects based on the character's powers or capabilities.

15. A content server connected to a network, comprising:
a memory that stores rich media content including rich media clips related to a game; and
a processor configured to execute instructions that cause the processor to perform operations comprising:
receiving a request including a player's in-game characteristics generated based on gameplay, wherein the in-game characteristics comprise a player's in-game position and a player's in-game attribute;
identifying, during game play, a plurality of rich media clips stored on the content server based on the player's in-game characteristics;
selecting a first version of a rich media clip having a first resolution from the identified plurality of rich media clips based on the first resolution corresponding to a distance between the player's in-game position and an in-game object; and
streaming, via the network, the first version of the rich media clip to a gaming console.

16. The content server of claim 15, wherein the operations further comprise:
performing, on the rich media clip, at least one of transcoding, warping, resizing, reshaping, protocol converting, transrating, clipping or combinations thereof, prior to streaming the rich media clip.

17. A method, comprising:
at a content server that stores rich media content including rich media clips related to a game, the content server being connected to a network:
receiving a request including a player's in-game characteristics generated based on gameplay, wherein the in-game characteristics comprise a player's in-game position and a player's in-game attribute;
identifying, during game play, a plurality of rich media clips stored on the content server based on the player's in-game characteristics;
selecting a first version of a rich media clip having a first resolution from the identified plurality of rich media clips based on the first resolution corresponding to a distance between the player's in-game position and an in-game object; and
streaming, via the network, the first version of the rich media clip to a gaming console.

18. The method of claim 17, further comprising:
performing, on the rich media clip, at least one of transcoding, warping, resizing, reshaping, protocol converting, transrating, clipping or combinations thereof, prior to streaming the rich media clip.

* * * * *